UNITED STATES PATENT OFFICE.

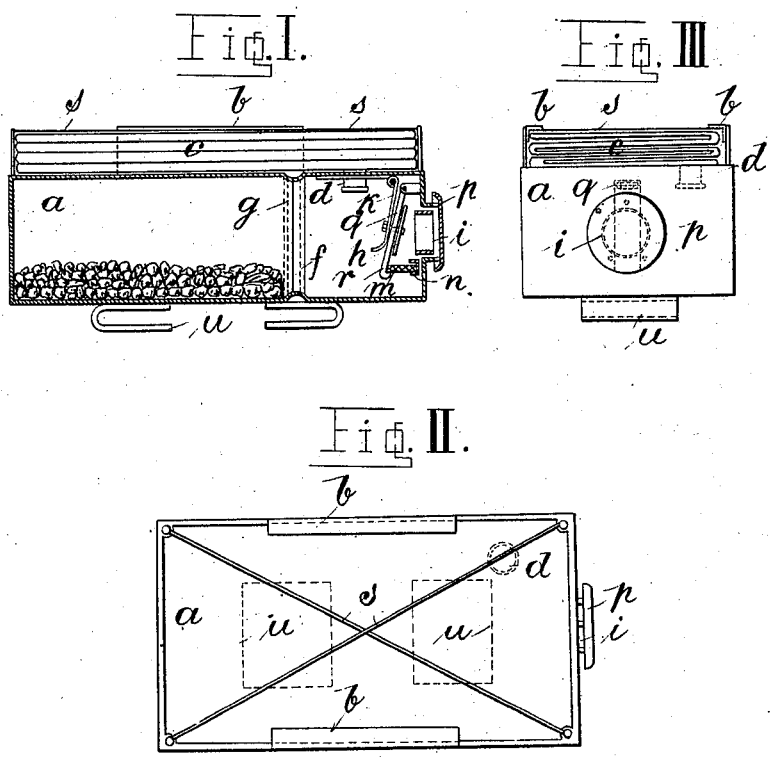

GEORG IRSAY DE IRSA, OF VIENNA, AUSTRIA-HUNGARY.

LIFE-PRESERVER.

SPECIFICATION forming part of Letters Patent No. 685,611, dated October 29, 1901.

Application filed June 20, 1900. Serial No. 20,940. (No model.)

*To all whom it may concern:*

Be it known that I, GEORG IRSAY DE IRSA, first lieutenant in the Seventh Hussars, a subject of the Emperor of Austria-Hungary, and a resident of Josefstädterstrasse 23, Vienna, VIII, Austria-Hungary, have invented certain new and useful Improvements in Automatic Life-Saving Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to a device for use automatically to preserve from the danger of drowning. The device is carried by the person to be preserved and becomes operative only on being brought into water and in such manner that within an extremely short period of a few seconds at the utmost its action begins—*i. e.*, the person provided with the device is brought to the surface.

In the accompanying drawings, Figure 1 is a vertical longitudinal section. Fig. 2 is a plan, and Fig. 3 is an end elevation.

The device consists of a case $a$, with which is connected a folded bladder $c$ by means of clamps $b$. This bladder communicates with the case through a branch $d$. A partition, consisting of a sieve $f$ and of cotton-wool disk $g$, divides the case $a$ into two chambers. In one chamber is placed a substance which on being brought in contact with water generates gas—such, for instance, as calcium carbid—and the other chamber contains a valve, hereinafter more fully described. The disk $g$, consisting of loose cotton-wool, is preferably covered with salt for the purpose of preventing access of moist air to the calcium carbid. The second chamber has an opening $i$, closed by a valve $h$. This valve is generally open and is arranged so as to close automatically when a predetermined quantity of water has penetrated into the receiver. The valve $h$ is controlled by a spring $k$ and is held open by means of a piece $m$. This latter piece $m$ is chiefly prepared of a substance soluble in water, and to prevent access of atmospheric moisture it is coated with collodion. As a suitable substance from which to construct this piece $m$ may be mentioned a mixture of soda, tartaric acid, and potassium chlorid. The piece $m$ is inserted with one end into pincers $n$, its other end resting against the valve $h$. The access of air to the interior of the whole apparatus is further prevented, as far as possible, by arranging a bell $p$ over the opening $i$. The valve $h$ is movably supported on a lever $q$ and provided with packing-wings $r$ in order to render the closing of the opening $i$ as air-tight as possible. In order to reduce the volume of the whole apparatus to a minimum, the bladder $c$ is held folded by means of strings of easily-breakable material. Finally hooks $u$ are provided on one of the outer walls of the device, whereby it may be secured to any piece of clothing.

Instead of the generally open valve a valve may be used which instantly opens under the influence of the outer water-pressure and admits water, but then closes again under the influence of the pressure of gas in the interior of the apparatus.

The working of the apparatus is as follows: As soon as the apparatus is brought under water, water enters the first chamber through the opening $i$, dissolving the hygroscopic coating on the piece $m$, made of collodion or the like substance. It then passes through the layer of cotton-wool and enters the second chamber, where it produces an energetic development of gas. The water causes also the dissolution of the piece $m$, so that the valve $h$ gradually closes. This can be so proportioned that complete closing of the opening $i$ takes place when a quantity of water sufficient to generate the gas required has entered the apparatus. When the opening $i$ is closed, the gas produced passes through the branch $d$ into the bladder, which is blown out, the strings $s$ being broken. This balloon filled with gas insures sufficient bouyancy to bring a human body to the surface and to hold it up there for a sufficiently long time.

Having thus described my invention, what I claim as new therein, and desire to secure by Letters Patent of the United States of America, is—

1. An automatic life-saving apparatus, comprising a receiving-chamber for a suitable chemical, generating gas upon contact with water, a water-inlet chamber separated from the receiving-chamber by a porous partition, an inlet-valve for the water-chamber, an inflatable gas-receiver communicating with the water-chamber, and means for attaching the device to the person, substantially as set forth.

2. An automatic life-saving apparatus, comprising a receiving-chamber for a suitable chemical, generating gas upon contact with water, a water-inlet chamber provided with an inlet-valve, a porous partition separating said chambers, a soluble piece of suitable material adapted to retain the inlet-valve normally open, an inflatable gas-receiver communicating with the water-inlet chamber, and means for attaching the device to the person, substantially as set forth.

In testimony that I claim the foregoing as my invention I have signed my name in presence of two subscribing witnesses.

GEORG IRSAY DE IRSA.

Witnesses:
ALVESTO S. HOGUE,
AUGUST FUGGER.